(12) United States Patent
Ungar et al.

(10) Patent No.: US 8,171,411 B1
(45) Date of Patent: May 1, 2012

(54) SYSTEM AND METHOD FOR DELIVERING CONTENT IN A MOVIE TRAILER

(75) Inventors: Scott W. Ungar, Cherry Hills Village, CO (US); Ken J. Venturi, Cherry Hills Village, CO (US); Hyung Shik Kim, Centennial, CO (US)

(73) Assignee: National CineMedia LLC, Centennial, CO (US)

( * ) Notice: Subject to any disclaimer, the term of this patent is extended or adjusted under 35 U.S.C. 154(b) by 442 days.

(21) Appl. No.: 12/543,436

(22) Filed: Aug. 18, 2009

Related U.S. Application Data (60) Provisional application No. 61/089,822, filed on Aug. 18, 2008, provisional application No. 61/110,420, filed on Oct. 31, 2008, provisional application No. 61/111,331, filed on Nov. 4, 2008, provisional application No. 61/222,072, filed on Jun. 30, 2009.

(51) Int. Cl.
*G06F 3/00* (2006.01)
*G06F 3/048* (2006.01)

(52) U.S. Cl. ........ 715/719; 715/835; 715/733; 715/765; 709/201; 709/203

(58) Field of Classification Search ................ 715/719, 715/733, 744, 765, 781, 810, 835, 846
See application file for complete search history.

(56) References Cited

U.S. PATENT DOCUMENTS

| | | | |
|---|---|---|---|
| 5,408,417 A | 4/1995 | Wilder | |
| 5,568,390 A | 10/1996 | Hirota et al. | |
| 5,774,664 A | 6/1998 | Hidary et al. | |
| 5,790,121 A | 8/1998 | Sklar et al. | |
| 5,855,006 A | 12/1998 | Huemoeller et al. | |
| 5,926,108 A | 7/1999 | Wicks et al. | |
| 5,960,406 A | 9/1999 | Rasansky et al. | |
| 6,047,260 A | 4/2000 | Levinson | |
| 6,119,095 A | 9/2000 | Morita | |
| 6,369,840 B1 | 4/2002 | Barnett et al. | |
| 6,434,482 B1 | 8/2002 | Oshida et al. | |

(Continued)

FOREIGN PATENT DOCUMENTS

EP     1096405     5/2001

(Continued)

OTHER PUBLICATIONS http://www.bizreport.com/2007/04/can_optin_ads_boost_online_video_revenue.html; printed Jun. 7, 2011.

(Continued)

*Primary Examiner* — Xiomar L Bautista
(74) *Attorney, Agent, or Firm* — Bryan Cave LLP (57) ABSTRACT

A system and method for delivering content in a movie trailer and a system for implementing the same. The method includes receiving a request to deliver a shell application having a configuration dependent on a selected movie. Appropriate multi-media content and a scrubber bar are determined at a configuration server for the selected movie. Both the multi-media content and the scrubber bar are configured for the selected movie. The scrubber bar includes a timeline that is associated with the multi-media content from which progress through the multi-media content can be tracked. The scrubber bar includes at least one Q-point located within the time line. The shell application that is configured to include the multi-media content and the scrubber bar is then delivered to the client device.

20 Claims, 5 Drawing Sheets

U.S. PATENT DOCUMENTS

| | | |
|---|---|---|
| 6,446,004 B1 | 9/2002 | Cao et al. |
| 6,496,981 B1 | 12/2002 | Wistendahl et al. |
| 6,590,837 B1 | 7/2003 | Kaplan |
| 6,615,408 B1 | 9/2003 | Kaiser et al. |
| 6,816,778 B2 | 11/2004 | Diaz |
| 6,839,628 B1 | 1/2005 | Tu |
| 6,963,900 B2 | 11/2005 | Boyd |
| 7,069,228 B1 | 6/2006 | Rose et al. |
| 7,080,078 B1 | 7/2006 | Slaughter et al. |
| 7,207,053 B1 | 4/2007 | Asmussen |
| 7,212,983 B2 | 5/2007 | Redmann et |
| 7,236,976 B2 | 6/2007 | Breitenbach et al. |
| 7,249,367 B2 | 7/2007 | Bove et al. |
| 7,406,433 B2 | 7/2008 | Mashimo et al. |
| 7,711,478 B2 | 5/2010 | Gluck |
| 2002/0069093 A1 | 6/2002 | Stanfield |
| 2002/0078456 A1 | 6/2002 | Hudson et al. |
| 2002/0112249 A1 | 8/2002 | Hendricks et al. |
| 2002/0113803 A1 | 8/2002 | Samra et al. |
| 2002/0129057 A1 | 9/2002 | Spielberg |
| 2002/0147611 A1 | 10/2002 | Greene et al. |
| 2002/0156787 A1 | 10/2002 | Jameson et al. |
| 2003/0004773 A1 | 1/2003 | Clark et al. |
| 2003/0023463 A1 | 1/2003 | Dombroski et al. |
| 2003/0055690 A1 | 3/2003 | Garback |
| 2003/0069071 A1 | 4/2003 | Britt et al. |
| 2003/0069899 A1 | 4/2003 | Brown et al. |
| 2003/0177044 A1 | 9/2003 | Sokel et al. |
| 2003/0191772 A1 | 10/2003 | Schaumann et al. |
| 2004/0044732 A1 | 3/2004 | Fushiki et al. |
| 2004/0059643 A1 | 3/2004 | Marti |
| 2004/0117275 A1 | 6/2004 | Billera |
| 2004/0125121 A1 | 7/2004 | Pea et al. |
| 2004/0210381 A1 | 10/2004 | Zhao et al. |
| 2004/0233233 A1 | 11/2004 | Salkind et al. |
| 2004/0237032 A1 | 11/2004 | Miele et al. |
| 2005/0033615 A1 | 2/2005 | Nguyen et al. |
| 2005/0034151 A1 | 2/2005 | Abramson |
| 2005/0038690 A1 | 2/2005 | Hayes-Roth |
| 2005/0075166 A1 | 4/2005 | Hemstreet et al. |
| 2005/0075925 A1 | 4/2005 | Sash |
| 2005/0086690 A1 | 4/2005 | Gilfix et al. |
| 2005/0120052 A1 | 6/2005 | Miller et al. |
| 2005/0203783 A1 | 9/2005 | Allen et al. |
| 2005/0216550 A1 | 9/2005 | Paseman et al. |
| 2005/0222890 A1 | 10/2005 | Cheng et al. |
| 2005/0227216 A1 | 10/2005 | Gupta |
| 2005/0251331 A1 | 11/2005 | Kreft |
| 2005/0262149 A1 | 11/2005 | Jung et al. |
| 2005/0267787 A1 | 12/2005 | Rose et al. |
| 2005/0288046 A1 | 12/2005 | Zhao et al. |
| 2006/0041663 A1 | 2/2006 | Brown et al. |
| 2006/0047825 A1 | 3/2006 | Steenstra et al. |
| 2006/0048059 A1 | 3/2006 | Etkin |
| 2006/0064346 A1 | 3/2006 | Steenstra et al. |
| 2006/0085419 A1 | 4/2006 | Rosen |
| 2006/0095331 A1 | 5/2006 | O'Malley et al. |
| 2006/0129908 A1 | 6/2006 | Markel |
| 2006/0150212 A1 | 7/2006 | Magnussen et al. |
| 2006/0174312 A1 | 8/2006 | Ducheneaut et al. |
| 2006/0242016 A1 | 10/2006 | Chenard |
| 2006/0259588 A1 | 11/2006 | Lerman et al. |
| 2006/0265361 A1 | 11/2006 | Chu |
| 2006/0287105 A1 | 12/2006 | Willis |
| 2006/0287815 A1 | 12/2006 | Gluck |
| 2006/0294043 A1 | 12/2006 | Taisdeal |
| 2007/0003223 A1 | 1/2007 | Armstrong et al. |
| 2007/0005419 A1 | 1/2007 | Horvitz et al. |
| 2007/0016689 A1 | 1/2007 | Birch |
| 2007/0032945 A1 | 2/2007 | Kaufman |
| 2007/0033531 A1 | 2/2007 | Marsh |
| 2007/0038727 A1 | 2/2007 | Bailey et al. |
| 2007/0066397 A1 | 3/2007 | Nammi et al. |
| 2007/0067392 A1 | 3/2007 | Torres et al. |
| 2007/0073810 A1 | 3/2007 | Adams et al. |
| 2007/0088801 A1 | 4/2007 | Levkovitz et al. |
| 2007/0089150 A1 | 4/2007 | Bowler |
| 2007/0094065 A1 | 4/2007 | Wu et al. |
| 2007/0106468 A1 | 5/2007 | Eichenbaum et al. |
| 2007/0106627 A1 | 5/2007 | Srivastava et al. |
| 2007/0112609 A1 | 5/2007 | Howard et al. |
| 2007/0112719 A1 | 5/2007 | Reich et al. |
| 2007/0130007 A1 | 6/2007 | Haberman et al. |
| 2007/0143155 A1 | 6/2007 | Whitsett et al. |
| 2007/0143788 A1 | 6/2007 | Abernathy et al. |
| 2007/0150537 A1 | 6/2007 | Graham |
| 2007/0156883 A1 | 7/2007 | Thompson et al. |
| 2007/0162432 A1 | 7/2007 | Armstrong et al. |
| 2007/0168892 A1 | 7/2007 | Brush et al. |
| 2007/0174042 A1 | 7/2007 | Thompson |
| 2007/0179792 A1 | 8/2007 | Kramer |
| 2007/0179819 A1 | 8/2007 | Bradley et al. |
| 2007/0200713 A1 | 8/2007 | Weber et al. |
| 2007/0201482 A1 | 8/2007 | Kharebov et al. |
| 2007/0203971 A1 | 8/2007 | Walker et al. |
| 2007/0213047 A1 | 9/2007 | Kolker |
| 2007/0233658 A1 | 10/2007 | Coughlin et al. |
| 2008/0098313 A1 | 4/2008 | Pollack |
| 2008/0167015 A1 | 7/2008 | Vishwanathan et al. |
| 2009/0082038 A1 | 3/2009 | McKiou et al. |
| 2009/0100037 A1 | 4/2009 | Scheibe |
| 2009/0112467 A1 | 4/2009 | Jiang et al. |
| 2010/0005496 A1* | 1/2010 | Ellis et al. .................. 725/87 |
| 2010/0153999 A1* | 6/2010 | Yates ............................ 725/39 |

FOREIGN PATENT DOCUMENTS

| | | |
|---|---|---|
| JP | 2001306574 | 11/2001 |
| JP | 2001349735 | 12/2001 |
| JP | 2007127655 | 5/2007 |
| WO | 0124067 | 4/2001 |
| WO | 0159590 | 8/2001 |
| WO | 0165445 | 9/2001 |
| WO | 0248842 | 6/2002 |
| WO | 03090144 | 10/2003 |
| WO | 2005013169 | 2/2005 |
| WO | 2005029452 | 3/2005 |
| WO | 2005086865 | 9/2005 |
| WO | 2006055042 | 5/2006 |
| WO | 2006131277 | 12/2006 |
| WO | 2007053898 | 5/2007 |
| WO | 2007082167 | 7/2007 |
| WO | 2009008867 | 1/2009 |

OTHER PUBLICATIONS http://www.clickz.com/3574801 ; printed Jun. 7, 2011.

http://www.evite.com; printed Mar. 18, 2011.

http://www.flixster.com; printed Mar. 18, 2011.

http://www.yamji.com/ ; printed Mar. 18, 2011.

http://www.filmcrave.com ; printed Mar. 18, 2011.

http://www.threemoviebuffs.com/intheaters.php; printed Mar. 18, 2001.

Evite Hooks Up with Fandango; http://socialtech.com/evite_hooks_up_with_fandagno/s-0000578.html; Mar. 18, 2011.

Golbeck, J; Filmtrust: Movie Recommendations From Semantic Web-Based Social Networks; Conf: 2007, 4th IEEE Consumer Communications and Networking Conf, Jan. 11-13, 2007, Las Vegas, NV.

Non-Final Office Action issued in U.S. Appl. No. 12/436,568 on Sep. 24, 2010 (10101).

Final Office Action issued in U.S. Appl. No. 12/436,568 on Apr. 11, 2011 (10101).

Non-Final Office Action issued in U.S. Appl. No. 12/436,658 on Oct. 21, 2010 (10201).

Final Office Action issued in U.S. Appl. No. 12/436,658 on Apr. 11, 2011 (10201).

Non-Final Office Action issued in U.S. Appl. No. 12/436,610 on Dec. 8, 2010 (10401).

* cited by examiner

SYSTEM AND METHOD FOR DELIVERING CONTENT IN A MOVIE TRAILER

CROSS REFERENCE TO RELATED APPLICATIONS

The present application claims priority to and the benefit of Provisional Application No. 61/089,822, entitled "Rich Media Network," with filing date Aug. 18, 2008, which is herein incorporated by reference in its entirety. Further, the present application claims priority to and the benefit of Provisional Application No. 61/110,420, entitled "Features of a Rich Media Network," with filing date Oct. 31, 2008, which is herein incorporated by reference in its entirety. In addition, the present application claims priority to and the benefit of Provisional Application Ser. No. 61/111,331, entitled "Additional Features of a Rich Media Network," with filing date Nov. 4, 2008, which is herein incorporated by reference in its entirety. Also, the present application claims priority to and the benefit of Provisional Application No. 61/222,072, entitled "System and Method for Asset Distribution," with filing date Jun. 30, 2009, which is herein incorporated by reference in its entirety.

BACKGROUND OF THE INVENTION

The internet creates new ways to transfer information between users throughout the world. In general, the internet is a global system of interconnected networks that are able to communicate with each other. Each user is part of one of the networks that combined form the internet. As such, a user can access the internet through a corresponding network to visit other users and sites on the internet. Ever evolving services as implemented through the internet provide for the communication of information for business, education, work, private, and social purposes. As a result, these services attract increasing numbers of users to the internet year after year.

The proliferation of information over the internet is growing year by year. In fact, the ability to provide the information over the internet enriches the world of everyday users with information that heretofore was difficult if not impossible to obtain. For instance, movie trailers were only shown in movie theaters or on the television as advertising. As such, a user may get a chance to see a movie trailer once or twice a week. Now, the internet brings movie trailers to the screen of a computing device. As such, a user may choose to view movie trailers whenever the user wishes, and as many times as the user wishes.

With the availability of information, users begin to rely on certain information in their daily lives. For instance, a user may wish to view movie trailers to determine which movie to attend over the coming weekend. In addition, the user may enjoy viewing movie trailers just to see which movies are in circulation. As a result, web sites on the internet must manage increasing volumes of information that are presented to the user. Information delivery platforms that are more flexible and that provide heretofore unknown delivery of content and advertising would be more interesting to viewers and would benefit from increased user traffic.

SUMMARY OF THE INVENTION

The present invention relates to the field of data delivery. Specifically, the present invention relates to the management and delivery of a shell application that is configurable according to a selected movie, and includes a corresponding movie trailer as well as additional content For instance embodiments of the present invention provide for a method of delivering content in a movie trailer and a system for implementing the same. The method includes receiving at an asset server a request to deliver over a communication network a shell application having a configuration dependent on a selected movie. More specifically, a client device associated with a user is requesting a movie trailer package that includes the movie trailer as well as additional content. Modules in the movie trailer package are dependent on the selected movie, and as such, the request includes a movie identifier that is associated with the selected movie. Also, appropriate multi-media content and a scrubber bar are determined at a configuration server for the selected movie, both of which are configured for the selected movie. The scrubber bar includes a timeline that is associated with the multi-media content from which progress through the multi-media content can be tracked. The scrubber bar includes at least one Q-point located within the time line. The shell application, configured to include the multi-media content and the scrubber bar, is then delivered to the client.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Reference will now be made in detail to the preferred embodiments of the present invention, systems and methods for a delivering content associated with a movie trailer. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention provide for a method for delivering content associated with a movie trailer, and a delivery platform that is capable of providing a shell application that is dynamically configurable to deliver movie trailers and content in any combination. In that manner the delivery platform is able to manage and deliver ever increasing amounts of information tied to the entertainment industry.

1. Notation and Nomenclature

Embodiments of the present invention can be implemented on software running on a computer system. The computer system can be a personal computer, notebook computer, server computer, mainframe, networked computer, handheld computer, personal digital assistant, workstation, mobile devices, and the like. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "determining," "providing," "receiving," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

2. HyperTrailer Delivery Platform

Figure 1:
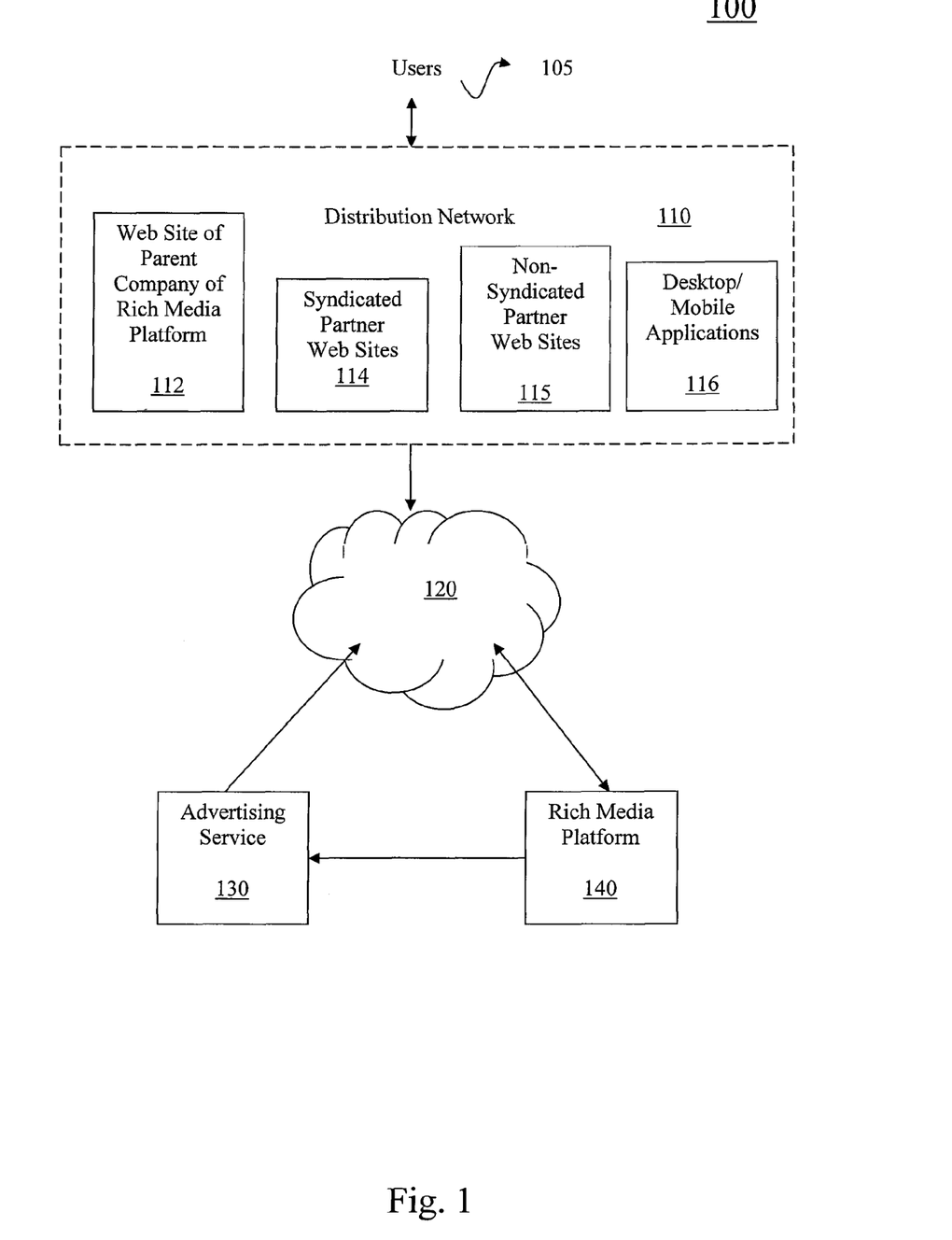
FIG. 1 is an illustration of a communication system for distributing assets, in accordance with one embodiment of the present invention.

FIG. 1 is a diagram illustrating a communication network 100 supporting the distribution of information, such as advertising, entertainment based information, etc., in accordance with one embodiment of the present invention. On the front end, a plurality of users, including a user associated with client device 105, is presented with content for viewing through a distribution network 110. On the back end, a rich media platform 140 supports the centralized selection, management, and delivery of rich media, to include movie trailers and additional content, to the plurality of users 105. A third party advertising service 130 is also included to provide advertising for display as an asset or in conjunction with assets.

Throughout the present Application, the term "asset" is meant to include any type of content or data that is available over the communication network 100. For instance, content includes advertising, applications, widget applications, static content, various multi-media content, movie trailers, advertising, and combinations therein.

In addition, the term "widget" is used throughout the present Application and is meant to describe applications, as implemented and distributed through the communication network 100, such as the internet 120. These widgets are specific instantiations of an asset, previously described.

In one implementation, these widgets may include a grouping of code that may be embedded in hypertext markup language (HTML) defining a web page, on a desktop as a desktop application. As such, a widget is a generic term for an application or functionality that is embedded in any web based application, such as a social network, blog, or corporate web site. The embedded code may include a tag, or any suitable control mechanism, command, or functionality, that is used to call the widget from a back-end server, such as the rich media platform 140, or to initiate communication with the back-end server for the deliver the widget. These widgets are configured to present various forms of information. For instance, a widget may display textual, graphical, video, or audio content, or some combination of those types of content. Other forms of content may also be displayed.

As one example, a widget may consist of a HyperTrailer application that includes a shell application capable of including a selected movie and additional content, both of which are dynamically configurable to the selected movie. As another example, a widget may display advertising information in addition to other content. In one embodiment of the present invention, a widget may display advertising information that is tailored and directed to a particular user. In addition, the network of widgets is configured to embrace an ever-expanding network, and is highly skinnable to provide for adapting to a particular advertising brand that is associated with a particular widget.

Assets are distributed throughout the distribution network 110, which supports various avenues for accessing those assets. For instance, asset delivery may be achieved through one or more third party web sites (e.g., syndicated partner web sites, non-syndicated partner sites, corporate web sites, search engines, etc.), desktop applications, mobile applications, etc. Some of these avenues for asset delivery communicate over the network 120 (e.g., interne) using any suitable communication protocol (e.g., hypertext transfer protocol [HTTP], etc.).

As shown in FIG. 1, asset delivery may be achieved through a web site 112 managed by the parent company that supports the rich media platform 140. As an example, the parent company may provide entertainment based services through the distribution of assets by the rich media platform 140 to the plurality of users 105 (e.g., distribution of content including movie trailers, movie reviews from well known critics, etc.).

In addition, asset delivery may be achieved through one or more web sites 114 associated with syndicated partners. These syndicated partners work in association with the rich media platform 140 to directly distribute content through their corresponding web sites 114. That is, these syndicated partners have requested that the content delivery services of the rich media platform 140 provide specific content (e.g., HyperTrailer application) for display on their web site. For instance, a syndicated partner may reserve space within its web site for the distribution of assets to be determined by the asset delivery system of the rich media platform 140.

Also, content delivery may be achieved through one or more non-syndicated web sites 115 that provide for the viral distribution of assets. For instance, a user may place content (e.g., widget) onto a web page controlled by the user (e.g., a user's blog). As such, the user may embed particular content, or a call for a particular asset, onto the user's page. Embedding the asset onto a user's web page allows for the viral distribution of the asset, through which central management and control of the widget being displayed is still achieved through the rich media platform 140.

Further, asset delivery may be achieved through desktop and mobile applications 116 that retrieve the assets on the back end through the rich media platform 140. That is, a user may elect to bring in an asset, such as a widget to a desktop location, such that the widget runs as an independent application on the desktop of the user's computing resource. For instance, the user may elect to embed a widget, or a call for a widget, onto the desktop. As such, these widgets run as independent applications, and may continuously run in the background, while the user is accessing other applications, such as word processing application. Also, asset delivery may be achieved through mobile applications that are supported through the various mobile communication protocols (e.g., WAP/WML, WAP/XHTML, MP/CSS, etc.).

For purposes of the present invention, at least one asset requires support from an back-end server for information, where the back-end server is accessed through a communication network, such as the internet. That is, through each of the avenues of distribution in the distribution network 110, asset delivery is achieved through the rich media platform 140. As such, the rich media platform 140 includes a server system at the back-end that provides support for all data requests coming from assets, or in association with deliverable assets. As such, the rich media platform 140 delivers assets (e.g., widgets, images, advertising, etc.) that are configurable, for instance to a selected movie.

As a representative example, assets may be distributed through content provided by publishers within the distribution network 110. For instance, a requested web page containing content provided by a publisher may include a zone (e.g., space, window, or area) that is reserved for the presentation of an asset. As another example, in one implementation, an embedded tag within the web page calls up the asset to be delivered for display within the zone, or at least calls up the back-end server, rich media platform 140, for asset support. The rich-media platform 140 selects the appropriate asset displayable within the zone of the web page according to various conditions and parameters, to include information associated with the user, the publisher controlling the web server for the web page, as well as other discoverable communication related information.

Returning back to FIG. 1, also shown is a source for advertising. For instance, various advertising services are able to provide advertising content to users requesting content. In one instance, these third party advertising services 130 provide information as content displayable within the zone of a web page reserved for assets. In another instance, content is delivered in association with the assets for display to the user. As such, the advertising services may provide graphical, textual, video and audio content to be displayed directly through or in conjunction with the asset for display to the plurality of users 105.

Because the selection of content is supported by the rich media platform, information associated with the user (e.g., user profile data, information native to communication from the client device associated with the user) can be used to tailor content delivered to the user through the widget, in one embodiment. For instance, advertising content can be targeted directly to the user.

Figure 2A:
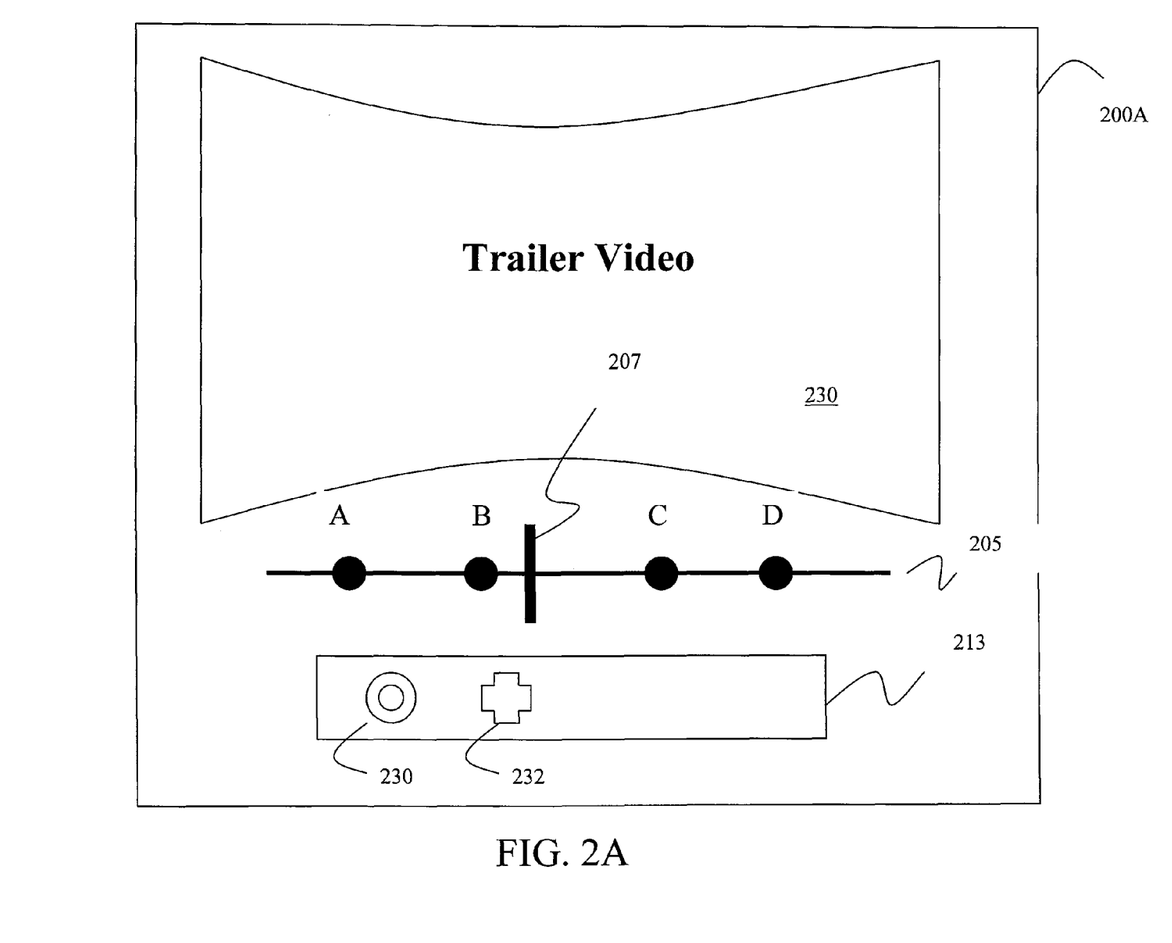
FIGS. 2A-B are illustrations of a shell application that includes a properly configured movie trailer and scrubber bar allowing access to additional content, in accordance with embodiments of the present invention.
Figure 2B:
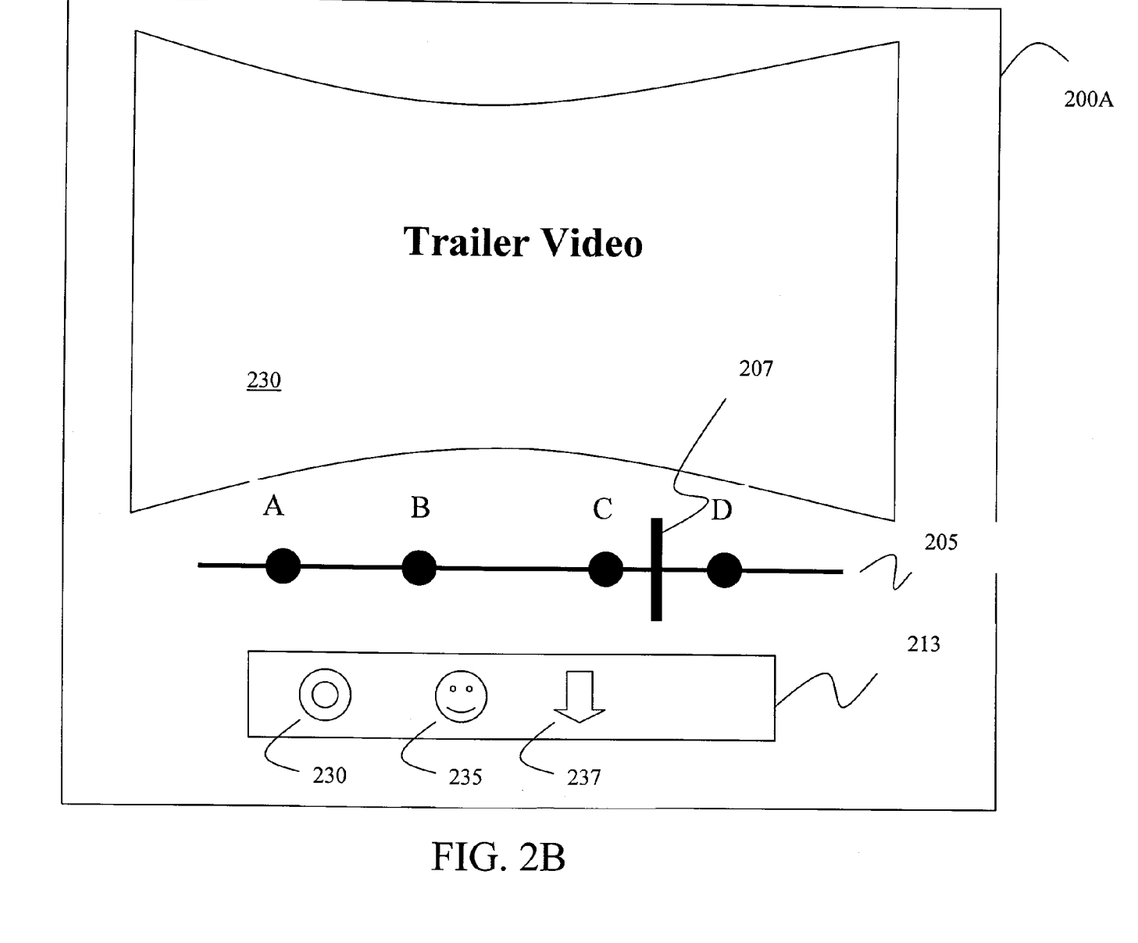

FIGS. 2A-B are illustrations of a "HyperTrailer" widget application that is deliverable by the rich media platform 140 according to configuration parameters dependent on a selected movie. That is, the HyperTrailer widget delivers a movie trailer for a selected movie and includes various other content dependent on corresponding configuration parameters. In particular, FIGS. 2A-B are illustrations of the HyperTrailer widget that provides access to additional content through access points, while a viewer is viewing a video sequence of a movie trailer, for example.

FIG. 2A illustrates a presentation of a shell application 200 of a HyperTrailer widget. The shell application 200 includes a movie trailer 230 and additional content that is accessible through the HyperTrailer. The HyperTrailer widget is configurable according to the movie trailer, in one embodiment. That is, depending on which movie is selected, configuration parameters define which movie trailer and other available content are appropriate.

The shell application 200 includes a scrubber bar 205 that includes a timeline. The timeline tracks interaction with the movie trailer 230 from a start time of the movie trailer to an end time of the movie trailer. For instance, position bar 207 indicates where the current position is in the video sequence of the movie trailer 230. As the user plays the video sequence, the position bar moves from a start position corresponding to a start of the video sequence to an end position corresponding to an end of the movie sequence.

Additionally, the scrubber bar 205 includes various Q-points (e.g., A-D) shown. These Q-points are configurable in terms of numbers of Q-points, and positioning within the timeline of the scrubber bar 205. As such, the number and positioning of Q-points may be different for various instantiations and configurations of the HyperTrailer shell application 200.

The Q-points define which additional content is available to the user. In particular, each Q-point is an entry portal that allows a user to access a set of modules. The modules in the set are selectable from a plurality of modules available to all configurations of the HyperTrailer widget. In addition, these modules can continually be edited and managed by the back-end server. As such, available modules can be added, deleted, edited, etc. by the back-end server at any time. This allows for updating of content and available modules for a particular instantiation of a HyperTrailer application.

In the shell application 200, modules are made available in the navigation bar 213. Modules are not immediately displayable to the user, but is instantiated on the user's client device once the user selects and activates the selected module. For instance, every module is represented by a corresponding icon. Once an icon is activated by the user, the corresponding icon is delivered for execution on the client device. In addition, each module may be supported by one or more associated servers operated by the content delivery platform 140 that is capable of displaying the module on the client device, in one embodiment. These modules may also be supported by third party servers, or a combination of third party servers and servers affiliated with the platform 140.

As shown in FIG. 2A, the position bar 207 is between Q-points B and C. In other words, position bar 207 is beyond, or is positioned past Q-point B. A set of modules is associated with the selected movie in the movie trailer 230 and Q-point B. Those modules are presented by corresponding icon in navigation bar 213. As shown, two different modules are available for Q-point B, and are shown by icons 230 and 232.

In one implementation, the modules are applications available through an entertainment based online social network. For instance, these modules may allow users to access event related information, such as event descriptions, event show times, reviews, etc. These events can be movies in one embodiment. For example, movie showtimes can be presented for various movies in a module from the plurality of modules 720. Also, movie reviews can be presented for various movies in another module. Still other modules provide other movie related information, such as: a mapping module providing mapping instructions to theaters; a movie search module allowing a user to search for movie information using search terms; an event planning module allowing a user to plan a night out around a central event that is a movie; a calendaring module that provides daily movie trivia, etc.

For instance, these modules may provide additional functions for a user related to the movie trailer. These additional functions may include links to other web sites; photos related to the selected movie in the movie trailer 230; additional video content related to the movie; downloadable content such as wallpapers and images; and other available content.

FIG. 2B is an illustration of the HyperTrailer feature of FIG. 2A, illustrating the change in the availability of the modules in the navigation bar, in accordance with one embodiment of the present invention. For instance, position bar 207 has moved beyond Q-point C in the video sequence, as represented on scrubber bar 205.

Available modules include three modules corresponding to icons 230, 235 and 237 according to configuration parameters that are dependent on the movie trailer and the corresponding Q-point. As shown, the module corresponding to icon 232 is not available in the navigation bar 213. However, two new modules corresponding to icons 235 and 237 are newly available. For instance, icon 235 provides access to a photo application that provides photos related to the movie trailer, and icon 237 provides access to downloadable content.

Figure 3:
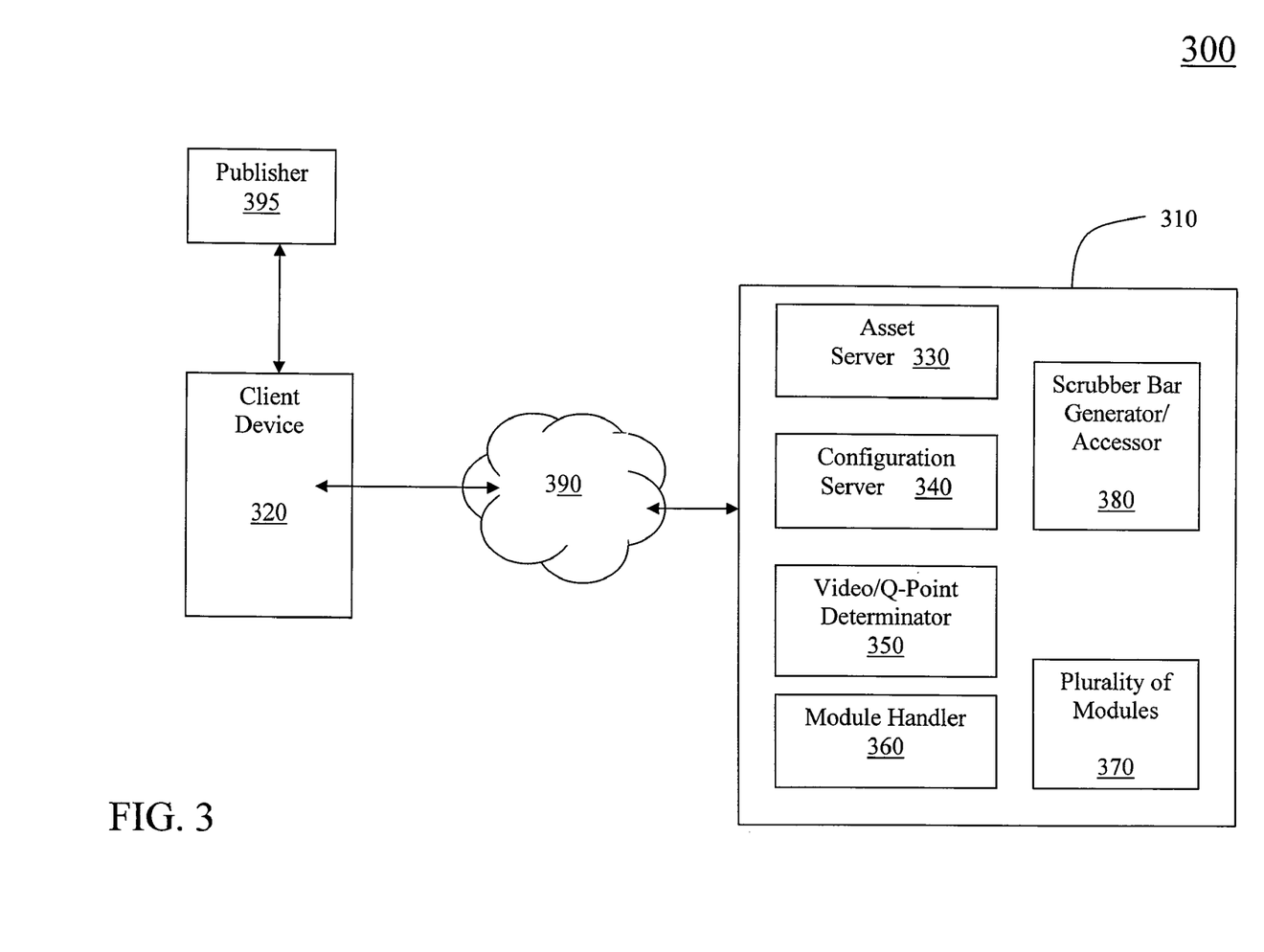
FIG. 3 is an illustration of a communication system for delivering content with a HyperTrailer application that delivers multi-media content, including movie trailers, in accordance with one embodiment of the present invention.
Figure 4:
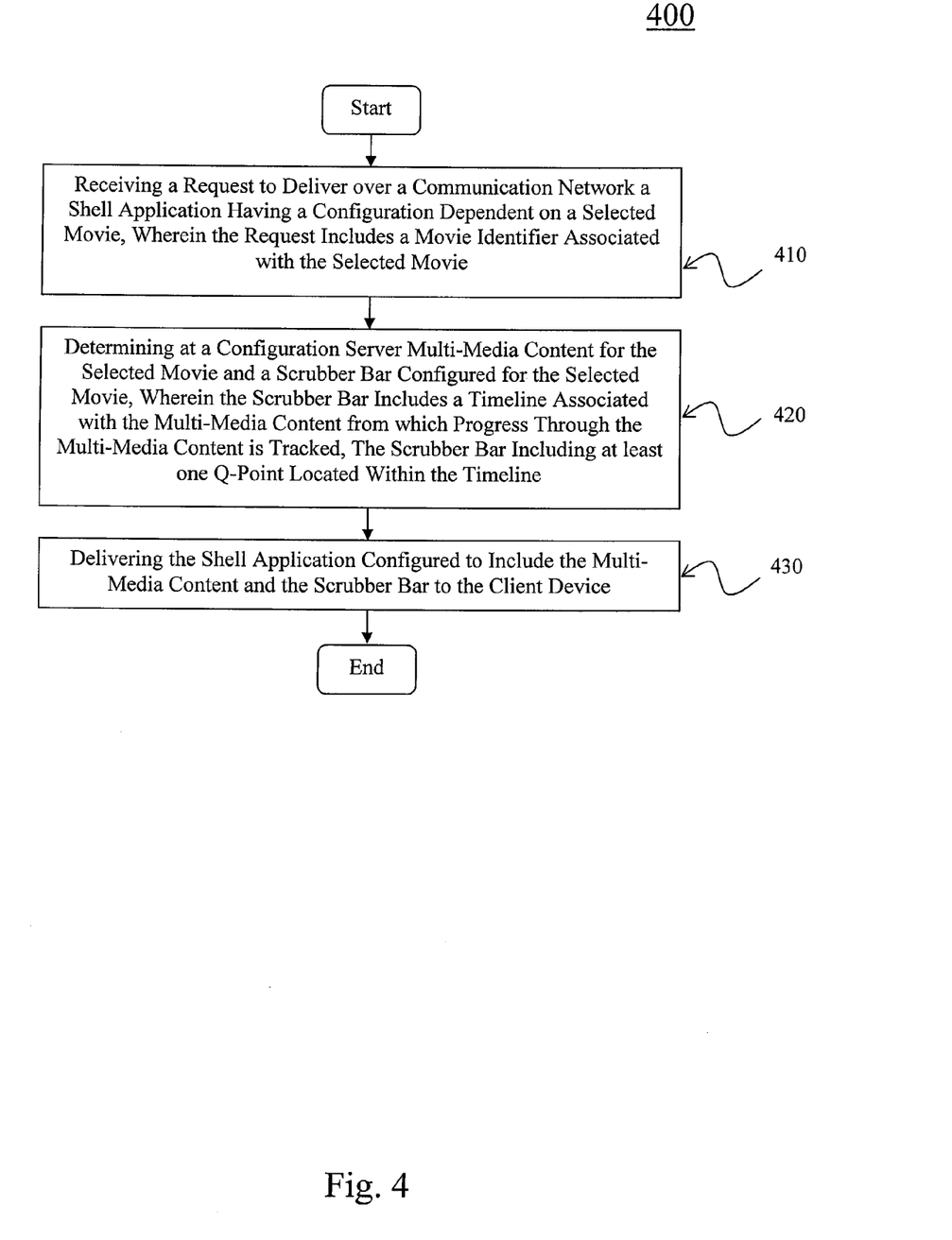
FIG. 4 is a flow chart illustrating a method for delivering an asset that is configurable depending on a selected movie trailer, in accordance with one embodiment of the present invention.

FIGS. 3 and 4 in combination illustrate the delivery of a shell application that is configurable to a particular movie application and additional content. For instance, the shell application may be a HyperTrailer application previously described in FIGS. 2A-B.

In particular, FIG. 3 is an illustration of a communication system 300 for delivering content in association with a selected movie trailer, in accordance with one embodiment of the present invention. The communication system 300 includes a content delivery platform 310 that delivers multi-media content, including movie trailers, as well as additional content related to the selected movie trailer. Communication with the information delivery platform 310 is achieved through a communication network 390, such as the internet. That is, though not necessarily shown, communication between the devices in FIG. 3 is enabled through the communication network 390.

As shown in FIG. 3, the client device 320 is accessing a publisher web site 395 for content. That content includes an asset that is configured to multi-media content. For instance, the publisher 395 may be the web site of the parent company of the rich media platform 140 that provides entertainment based services to users, or may be a syndicated partner, non-syndicated partner, etc. as previously described. As an example, the publisher 395 may provide access to a Hyper-Trailer application previously described in FIGS. 2A-B. As such, the user is requesting a selected movie trailer through the HyperTrailer application. In turn, the HyperTrailer application delivers through a back-end server a shell application that is configurable according to configuration parameters a movie trailer and additional content in conjunction with the movie trailer.

In one embodiment, the client device 220 is requesting the HyperTrailer widget application from publisher 295. For instance, the client device may be invoking embedded code within content provided by the publisher 295 to call the HyperTrailer widget. That embedded code may include a tag, or any suitable control mechanism, command, or functionality that is used to call the widget from the back-end server, the content delivery platform 210.

Because the delivery of the widget is performed by the content delivery platform, the HyperTrailer widget is configurable through a shell application to include any selectable movie trailer, as well as additional content. This additional content may include advertising, applications, static images, multi-media content, links, etc.

Now turning to FIG. 4, a flow chart is shown illustrating a method for delivering an asset that is configurable depending on a selected movie trailer, in accordance with one embodiment of the present invention. For instance the content delivery platform 310 is able to implement the method described in flow chart 400 to provide a shell application that is configurable to any selected multi-media content and corresponding scrubber bar.

At 410, a request to deliver a shell application having a configuration dependent on a selected movie is received. For instance the request is made by the client device 320 and received by the asset server 330 that is capable of delivering the appropriate HyperTrailer widget. The request includes identification information for the selected movie.

At 420, appropriate multi-media content is determined. The call for the HyperTrailer widget is made in association with a request for a specific or selected movie. Since that movie information is known, a configuration server 340 is able to access configuration parameters for the selected movie to determine the appropriate multi-media content to deliver, such as a movie trailer sequence corresponding to the selected movie.

In addition, the configuration server 340 is able to access or create a scrubber bar that is configured for the selected movie. As previously described, the scrubber bar includes a timeline associated with the multi-media content that tracks progress through the multi-media content.

In particular, scrubber bar includes at least one Q-point within the timeline. As such, the scrubber bar generator 380 is able either to access or generate the appropriately configured Q-points in the scrubber bar.

For example, the generator 380 is able to determine the proper number of Q-points and proper positioning of the Q-points in the scrubber bar. That is, generator 380 is able to define a corresponding set of modules for each Q-point in the scrubber bar. The set of modules is identifiable by the corresponding Q-point and multi-media (e.g., movie trailer) combination. The properly configured scrubber bar can be embedded within the video sequence, or provided separately for inclusion within the shell application to run in conjunction with the movie trailer.

Returning to FIG. 4, at 430, the properly configured shell application is delivered by the asset server 330 back to the client device 320. The shell application is configured to include the appropriate multi-media content and the scrubber bar.

As previously described in relation to FIGS. 2A-B, the multi-media content available in the shell application is executable on the client device. For instance, the multi-media content may be a movie trailer, and playable on the client device. Included within the shell application is a scrubber bar with Q-points. As a position bar moves or is positioned beyond a Q-point, a call is made back to the content delivery platform 310 to provide the appropriately configured icons corresponding to available modules.

For instance, a request is received from the client device to deliver representations (e.g., icons) of modules. As shown in FIG. 3, the request is received by the video/Q-point determinator 350. The determinator 350 is able to determine the proper Q-point through information received in the request. The combination of the Q-point and the selected movie can be used to reference the appropriate configuration parameters that define the set of modules corresponding to that Q-point. In other embodiments, the Q-point can be uniquely identified to reference the appropriate configuration parameters.

As such, a set of icons associated with the set of modules configured for that Q-point is determined by determinator 350. Additionally, the asset server is able to deliver the set of icons to the client device for display in the navigation bar included in the shell application.

While the movie trailer is playing, the icons in the navigation bar are used to activate the corresponding icon. That is, a user may pause the movie trailer in the background to activate a module. Once the user exits that module, the shell application may return to the movie trailer that is now playing, or may go to another selected module. Activation of a selected module is achieved by selecting the corresponding icon. Also, at any point, the user may return to the multi-media content (e.g., movie trailer) by activating a menu item (e.g., home button) included in the shell application.

Selection of an icon initiates communication back to the content delivery platform 310 for delivery of the module. This may be achieved through embedded tags, or any suitable functional mechanism that calls back to the content delivery platform 310. In particular, notification of activation of a selected icon from a set of icons associated with a Q-point and movie is received from the client device.

As shown in FIG. 3, the notification is received by the module handler 360. Thereafter, the handler 360 accesses the appropriate module corresponding to the selected icon from the plurality of modules 370. Then, the module handler is able to send the module back to the client device for execution within the shell application.

The process is repeatable for the selection of any subsequent selection of another icon. For instance, another request is received to deliver representations of modules that correspond to a second Q-point. Thereafter, a configuration server determines a second set of modules that is dependent on the Q-point and the selected movie. Then a second set of icons corresponding to the second set of modules is delivered back to the client device for display in a navigation bar included in the shell application.

A system and method for delivering content associated with a movie trailer, and a delivery platform that is capable of providing a shell application that is dynamically configurable to deliver movie trailers and content in any combination is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method for delivering information, comprising:
receiving at an asset server from a client device associated with a user a request to deliver over a communication network a shell application having a configuration dependent on a selected movie, said request including a movie identifier associated with said selected movie;
determining at a configuration server multi-media content for said selected movie and a scrubber bar configured for said selected movie, wherein said scrubber bar comprises a timeline associated with said multi-media content from which progress through said multi-media content is tracked, said scrubber bar comprising at least one Q-point located within said timeline; and
delivering said shell application configured to include said multi-media content and said scrubber bar to said client device.

2. The method of claim 1, wherein said determining multi-media content comprises:
determining said multi-media content comprising a movie trailer for said selected movie.

3. The method of claim 1, further comprising:
receiving from said client device a request to deliver representations of modules, wherein said request is generated by said client device when said interaction with said multi-media content is beyond a first Q-point;
determining at said configuration server a first set of modules dependent on said first Q-point and said selected movie, wherein each module is associated with a corresponding icon; and
delivering a first set of icons associated with said set of modules to client device for display in a navigation bar included within said shell application.

4. The method of claim 3, further comprising:
receiving from said client device notification of activation of a selected icon from said set of icons;
accessing a module corresponding to said selected icon; and
sending said module to said client device for execution within said shell application, wherein said client device executes said module while preserving in a background of said shell application said multi-media content that is retrievable upon exiting said selected module, and wherein said navigation bar includes said first set of icons.

5. The method of claim 4, further comprising:
including in said shell application a menu item, wherein activation of said menu item activates said multi-media content that is paused while said module is executed.

6. The method of claim 3, further comprising:
receiving from said client device another request to deliver representations of modules, wherein said request is generated by said client device when said interaction with said multi-media content is beyond a second Q-point;
determining at said configuration server a second set of modules dependent on said second Q-point and said selected movie, wherein each module in said second set of modules is associated with a corresponding icon; and
delivering a second set of icons corresponding to said second set of modules to said client device for display in a navigation bar included within said shell application.

7. The method of claim 1, further comprising:
providing said shell application that is configurable with any selected multi-media content and corresponding scrubber bar;
defining at said configuration server a corresponding set of modules for each Q-point in said corresponding scrubber bar, each of said corresponding set of modules identifiable by a corresponding Q-point/multi-media combination.

8. The method of claim 1, further comprising:
for a corresponding Q-point in said scrubber bar, embedding code in said scrubber bar initiating communication with said configuration server when said progress is beyond said corresponding Q-point.

9. A system for delivering information, comprising:
an asset server for receiving from a client device associated with a user a request to deliver over a communication network a shell application having a configuration dependent on a selected movie, said request including a movie identifier associated with said selected movie;

a configuration server for determining multi-media content for said selected movie and a scrubber bar configured for said selected movie, wherein said scrubber bar comprises a timeline associated with said multi-media content from which progress through said multi-media content is tracked, said scrubber bar comprising at least one Q-point located within said timeline; and wherein said asset server delivers said shell application configured to include said multi-media content and said scrubber bar to said client device.

10. The system of claim 9, wherein said multi-media content comprises a movie trailer for said selected movie.

11. The system of claim 9, wherein said asset server receives from said client device a request to deliver representations of modules, wherein said request is generated by said client device when said interaction with said multi-media content is beyond a first Q-point;

wherein said configuration server determines a first set of modules dependent on said first Q-point and said selected movie, wherein each module is associated with a corresponding icon; and wherein said module handler delivers a first set of icons associated with said set of modules to client device for display in a navigation bar included within said shell application.

12. The system of claim 11, further comprising:

a module handler for receiving from said client device notification of activation of a selected icon from said set of icons, wherein said module handler accesses a module corresponding to said selected icon; and wherein said asset server sends said module to said client device for execution within said shell application, wherein said client device executes said module while preserving in a background of said shell application said multi-media content that is retrievable upon exiting said selected module, and wherein said navigation bar includes said first set of icons.

13. The system of claim 9, wherein said asset server provides said shell application that is configurable with any selected multi-media content and corresponding scrubber bar, and wherein said module handler defines at said configuration server a corresponding set of modules for each Q-point in said corresponding scrubber bar, each of said corresponding set of modules identifiable by a corresponding Q-point/multi-media combination.

14. A system for delivering information, comprising:

means for receiving at an asset server from a client device associated with a user a request to deliver over a communication network a shell application having a configuration dependent on a selected movie, said request including a movie identifier associated with said selected movie;

means for determining at a configuration server multi-media content for said selected movie and a scrubber bar configured for said selected movie, wherein said scrubber bar comprises a timeline associated with said multi-media content from which progress through said multi-media content is tracked, said scrubber bar comprising at least one Q-point located within said timeline; and means for delivering said shell application configured to include said multi-media content and said scrubber bar to said client device.

15. The system of claim 14, wherein said means for determining multi-media content comprises:

means for determining said multi-media content comprising a movie trailer for said selected movie.

16. The system of claim 14, further comprising:

means for receiving from said client device a request to deliver representations of modules, wherein said request is generated by said client device when said interaction with said multi-media content is beyond a first Q-point;

means for determining at said configuration server a first set of modules dependent on said first Q-point and said selected movie, wherein each module is associated with a corresponding icon; and means for delivering a first set of icons associated with said set of modules to client device for display in a navigation bar included within said shell application.

17. The system of claim 16, further comprising:

means for receiving from said client device notification of activation of a selected icon from said set of icons;

means for accessing a module corresponding to said selected icon; and means for sending said module to said client device for execution within said shell application, wherein said client device executes said module while preserving in a background of said shell application said multi-media content that is retrievable upon exiting said selected module, and wherein said navigation bar includes said first set of icons.

18. The system method of claim 16, further comprising:

means for receiving from said client device another request to deliver representations of modules, wherein said request is generated by said client device when said interaction with said multi-media content is beyond a second Q-point;

means for determining at said configuration server a second set of modules dependent on said second Q-point and said selected movie, wherein each module in said second set of modules is associated with a corresponding icon; and means for delivering a second set of icons corresponding to said second set of modules to said client device for display in a navigation bar included within said shell application.

19. The system of claim 14, further comprising:

means for providing said shell application that is configurable with any selected multi-media content and corresponding scrubber bar;

means for defining at said configuration server a corresponding set of modules for each Q-point in said corresponding scrubber bar, each of said corresponding set of modules identifiable by a corresponding Q-point/multi-media combination.

20. The system of claim 14, further comprising:

for a corresponding Q-point in said scrubber bar, means for embedding code in said scrubber bar initiating communication with said configuration server when said progress is beyond said corresponding Q-point.

* * * * *